LINE PROTECTION IN RADIO RELAY SYSTEMS
Filed Feb. 28, 1961
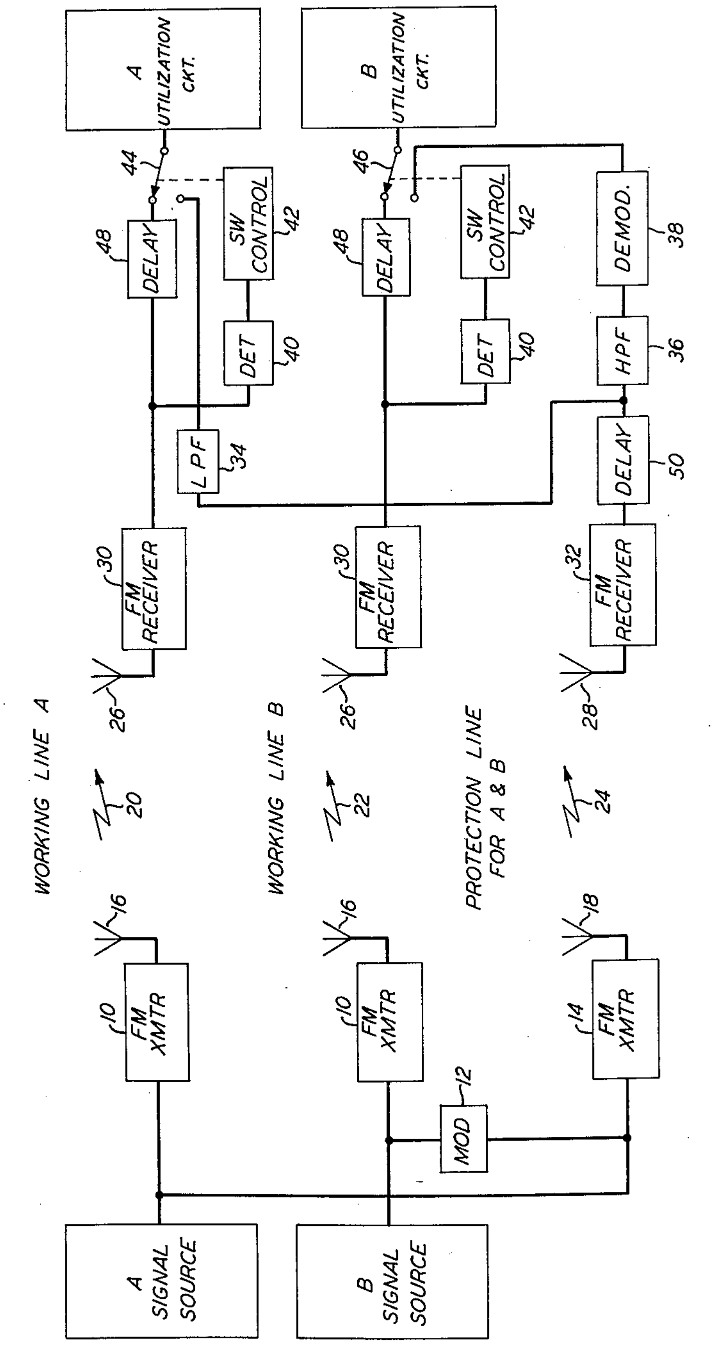
INVENTOR
L. G. ABRAHAM
BY
ATTORNEY 3,072,748

LINE PROTECTION IN RADIO RELAY SYSTEMS

Leonard G. Abraham, Madison, N.J., assignor to Bell Telephone Laboratories, Incorporated, New York, N.Y., a corporation of New York Filed Feb. 28, 1961, Ser. No. 92,261
6 Claims. (Cl. 179—15)

This invention relates to multilink transmission systems and, more particularly, to a protection arrangement for information bearing transmission links or lines of such systems.

It has been found that to insure the order of dependability required of transmission systems provision must be made to continue transmission of information in the face of component failures and adverse atmospheric phenomena. Thus, working transmission lines in a system are customarily designated to carry information from a sending point to a receiving point with some arrangement to substitute an identical protection transmission line to carry the information between the sending and receiving points in the event the information carried on a working line fails to arrive at its destination. Protection arrangements are particularly necessary for working lines in multilink transmission systems. In the absence of line protection, failure of one link of such a complex system may disable the whole system. The extensive nature of multilink systems accounts for an increased probability of such a disabling failure somewhere in the system.

In some instances, line protection of working lines has been achieved by furnishing a spare protection line for each working line. The working line and its corresponding protection line are permanently connected at the sending point so that a simple switching operation at the receiving point, upon the detection of an interruption of the signal carried on the working line, substitutes the protection line for the working line. Such a protection arrangement in which the same information is continually transmitted over both a working line and a protection line is sometimes called a one-for-one protection system.

Another type of protection configuration permits a decrease in the facilities required for line protection by sharing a single protection line among plural working lines connecting the same sending and receiving points. The nature of this circuit requires that, upon fault detection at the receiver, information identifying the disabled working line must be sent to the transmitter and the signal source of the disabled line connected at the sending point to the protection line in response thereto. This switching operation understandably may be attended by significant time delays and requires complex switching circuitry not necessary in the one-for-one protection system.

It is, therefore, the object of the present invention to reduce the transmitting facilities required to protect a plurality of working lines in a transmission system, and to eliminate time delays and the need for complex circuitry in converting operations from a working line to a protection line.

In accordance with the above object, protection is afforded plural working transmission lines interconnecting a transmitting point with a receiving point by abstracting at the transmitting point a portion of the signal carried on each of the working lines, combining these portions and transmitting them simultaneously over a unitary protection line.

More specifically, the portions of the information abstracted at the transmitting point are translated in frequency to different positions on the frequency spectrum and combined into a frequency-multiplexed signal. The combined signal is transmitted over a single protection line to the receiving point where the combined protection signal is separated into its component parts. Each component of the protection line signal is then returned to baseband frequency and made accessible to the utilization circuit of its corresponding working line. In the event of failure on a working line, such failure is detected at the receiving point and the information carried over the protection line substituted for that previously carried over the disabled working line. In effect, after detection of the working line disability, transmission is carried on between the information source at the transmitter and utilization device at the receiver of the disabled line via the protection line. Since the information corresponding to all the working lines is carried over the protection line continually in a one-to-one arrangement, information carried on the protection line may be substituted for information carried on a disabled working line in very short order and complex switching circuitry at the transmitter and receiver is not necessary.

The transmission characteristics of communication systems are generally designed to accommodate and transmit the information signal to the extent demanded by the system requirements as to signal quality. The outer extremities of the frequency band, the sloping portions of the transmission characteristics, however, are capable of transmitting information signals although not with the high degree of signal quality set out by the system requirements. Practically, the protection line signals are not required to be transmitted with the high quality necessary of the working line signals because the protection line is not contemplated for use an appreciable amount of the overall working time of the system and only relatively few of the links interconnecting a transmitting point with a receiving point in multilink systems might be expected to be disabled at any one time. The protection arrangement of the invention, predicated upon the practical consideration that the information conveyed by a protection line need not be of as high quality as that conveyed by a working line, can utilize the extremities of the frequency band to convey the protection line information, thus transmitting a plurality of protection signals over a frequency band normally designed for one working line signal. Likewise, the additional modulation noise attached to the protection line signal as a result of the increased power level of the protection line signal is acceptable.

An additional feature provides a fixed delay, equal to the conversion time from a working line to the protection line upon failure, located in the transmission path of each working line and protection line at the receiver. Thus, failure of a working line is in a sense anticipated and the period in which no information is applied to the utilization circuit of a disabled working line is diminished even further and can, in fact, be eliminated completely.

The above and other features of the invention will be considered in detail in the following specification taken in conjunction with the drawing, the single figure of whch illustrates a transmission link employing the principles of the invention to interconnect a transmitting point with a receiving point.

In the drawing, information signal sources A and B are connected to their respective utilization circuits, remotely located geographically from sources A and B, by working lines A and B, respectively, shown as radio transmission links. The illustrated circuit could represent one or more links in a multilink radio relay system or the complete transmission facility located between a transmitting station and a receiving station. The signals emanating from signal sources A and B are applied directly to individual transmitters 10 where they modulate a characteristic, for example the frequency, of carriers having different frequencies separated sufficiently to keep the modulated carriers which result out of range of each other. The modulated carriers are applied to individual antennas 16 for radiation into the atmosphere as radio signals 20 and 22, respectively. The signal emanating from source A is also applied directly to a transmitter 14 which serves the protection line. The signal emanating from source B is converted to a frequency position above that of the signal from source A in a modulator 12 and thereafter also applied to transmitter 14 in combination with the signal from source A. This combined multiplexed signal modulates a third carrier, having still a different frequency, which is in turn radiated from an antenna 18 into the atmosphere.

Working line signals 20 and 22 are intercepted by individual receiving antennas 26 and demodulated in receivers 30. The information signals thus recovered are applied through fixed delay devices 48, the purpose of which will be explained subsequently, to one terminal of a switch 44, in the case of working line A, and switch 46, in the case of working line B. The common terminals of switches 44 and 46 are connected to utilization devices A and B, respectively, resulting in a normally conductive path between receivers 30 and utilization devices A and B. Protection line signal 24 is intercepted in a similar fashion by an antenna 28 and demodulated in a receiver 32. A fixed delay device 50 is inserted in the common path of the protection line signal, after which that path divides into two branches. A low-pass filter 34 in the one branch permits separation of the information signal from source A and application thereof to the alternate, normally open terminal of switch 44. Separation of the information signal from source B is effected by a high-pass filter 36 in the other branch. After reduction to baseband frequency by a demodulator 38 this information signal is applied to the alternate, normally open terminal of switch 46.

Upon detection of a failure in either or both of the working lines, the corresponding detector 40 generates an actuating signal to cause its associated switch control 42 to make contact between the alternate terminal of switch 44 and/or switch 46 and its utilization circuit as required, thereby substituting the appropriate protection line information signal for the same information normally carried by the disabled working line. Any number of prior art failure detection schemes might be employed. For example, a pilot signal might be transmitted over each working line. Failure of the working line would then be accompanied by failure of the pilot signal to appear at the receiver or at least a reduction in the level of the pilot signal received. Detector 40 may be made to generate an actuating signal when the pilot signal or the message signal drops below a predetermined level so that the appropriate switch control 42 operates switch 44 and/or switch 46.

Both delays 48 and delay 50 are made equal to the time required for switches 44 and 46 to respond to a signal failure. Consequently, no interruptions occur in the signal appleid to utilization circuits A and B as a result of the response time of the switch control circuits. This system may therefore be considered to anticipate failure of a working line.

In communication systems, most notably radio communication systems, the transmission characteristics of a particular line are designed so that the information may be transmitted with a certain predetermined quality of transmission. There are other portions of the assigned frequency band in which the transmission characteristics, although not adequate to permit transmission of information signals with a quality which meets the standard required of the working line information are satisfactory for transmitting the information with a signal quality which is acceptable for protection line information. Considering the transmission characteristic of a particular working line categorically as having a flat, low attenuation middle portion with sloping higher attenuation portions on either extremity, it is these sloping portions, not generally capable of transmitting information with a quality acceptable for the working line, which are utilized to transmit part of the protection line information.

It is evident that the extent to which the invention may be practiced is dependent upon the transmission characteristics of the protection line and the quality of transmission of the protection line signal desired. In many situations it may be feasible to have one protection line serve more than two working lines. Wire and waveguide transmission lines may also employ this protection arrangement if their transmission characteristics practically allow it.

Additional reduction in quality of the information transmitted over the protection line occurs in the form of modulation noise because of the higher power level of the combined signal carried by the protection line.

The added degradation of the protection signal is acceptable in transmission for protection purposes. In a multilink communication complex, the quality of transmission necessary in each link is very high because noise accumulates from link to link and could become prohibitive in short order. The probability is, however, that very few of the protection lines would be in use at any one time so the additional noise accumulating from transmission through a few protection lines that degrade the information signal more than the working lines is negligible. In a single link communication system similarly, the effect of reduced quality of the protection line signal is tolerable if protection is to be afforded against momentary or short term failures such as selective fading.

In most frequency modulation radio relay systems the modulation index is so small that only the first order sidebands are of importance. In this case, changing the input level of the signals changes the magnitude of these sidebands relative to the carrier. With any practicable transmission apparatus, modulation products are formed between different frequencies in these sidebands. These products are greater when the line signal is greater. Therefore, when two or more working line signals are impressed on one protection line at normal levels, the cross modulation products are increased and modulation noise of each signal is greater than on the working lines. This can be decreased by reducing the level of each signal prior to application to the protection line, but at the expense of increasing the fluctuation noise of the signals so transmitted. However, a reasonable balance between the two types of noise can be obtained.

In a frequency modulation system employing a large modulation index, so that higher order sidebands are of importance, the information carried on the protection line may be made to occupy a space on the frequency spectrum no larger than the information carried on a working line. The frequency spectrum of a frequency modulated signal in general is made up of an infinite number of sidebands. To transmit perfectly distortionless information, all the sidebands must be transmitted. However, most of the information is contained in the lower order sidebands so that transmission of these sidebands to the exclusion of the higher order sidebands yields acceptable transmission. Hence, the protection line information can be made to occupy the same amount of frequency space as the information signals carried on each working line simply by reducing the number of frequency modulation sidebands which are transmitted over the protection line. Such a procedure is attended by increased signal distortion. But, for the protection line, as discussed previously, this is acceptable.

To reduce the distortion resulting above from excluding higher order sidebands on the protection line, the frequency deviation of the modulated carrier of the protection information may be reduced from that of the working lines. This causes a redistribution of more of the signal information into lower order sidebands.

What is claimed is:

1. In a communication system, a sending point and a receiving point, at least two working lines interconnecting said sending point and said receiving point, information signal sources individual to said working lines and situated at said sending point, a protection line interconnecting said sending point and said receiving point, apparatus at said sending point comprising means for transmitting each of said information signals over its respective working line, means for abstracting a portion of each of said information signals, means for combining said portions, and means for transmitting the combined signal over said protection line, and apparatus at said receiving point comprising means for recovering said information signals from said working lines, means for recovering said combined signal from said protection line, means for separating said combined signal into its component portions, load circuits individual to each of said working lines, means for applying each of said information signals carried by said working lines to its respective load circuit, and means upon failure of the information signal carried by any of said working lines to arrive satisfactorily at said receiving point for applying the portion of the information signal carried on said protection line corresponding to that carried on the failed working line to the load circuit of said failed working line.

2. In a communication system, a transmitter station and a receiver station, a plurality of working lines interconnecting said transmitter with said receiver, information signal sources individual to said working lines and located at said transmitter, means for transmitting each of said information signals over a different one of said working lines, a protection line interconnecting said transmitter with said receiver, means for abstracting a portion of each of said information signals at said transmitter, means for combining said portions into a frequency multiplexed signal, means for transmitting said frequency multiplexed signal over said protection line, means at said receiver for retrieving said information signals carried by said working lines, means at said receiver for retrieving said multiplexed signal, means for separating said portions, means for translating said portions to the frequency positions which their corresponding information signals carried on said working lines occupy, utilization circuits individual to each of said working lines and located at said receiver, means for applying each of said information signals transmitted over said working lines to its respective utilization circuit, and means effective upon the diminution below a predetermined level of any of said information signals received on said working lines for applying the information signal carried on said protection line corresponding to that carried on the disabled working line to the utilization circuit of said disabled line.

3. In a communication system, a transmitter and a receiver, first and second working lines interconnecting said transmitter with said receiver, first and second information signal sources located at said transmitter, means for conveying each of said information signals to said receiver by means of a different one of said working lines, a protection line interconnecting said transmitter with said receiver, means for abstracting part of each of said information signals, means for translating said parts to different positions on the frequency spectrum, means for merging said parts into a single frequency multiplexed signal, means for conveying said multiplexed signal to said receiver by means of said protection line, means at said receiver for recovering said information signals conveyed by said working lines and said multiplexed signal conveyed by said protection line, means for isolating said parts carried on said protection line from one another, means for translating said parts to the frequency range of said recovered information signals, first and second utilization circuits located at said receiver, and switching means for applying said information signals carried on said first and second working lines to said first and second utilization circuits, respectively, when said information signals carried on said working lines are being received at said receiver and upon failure of either said information signals of said working lines to arrive at said receiver for applying the information carried on said protection line corresponding to that carried on the disabled working line to the utilization circuit of said disabled line.

4. In a frequency modulation communication system, a sending station and a receiving station, a plurality of working lines interconnecting said sending station with said receiving station, information signal sources individual to said working lines and situated at said transmitter, means for converting each of said information signals to a frequency modulated signal for transmission, means for transmitting said modulated signals over their respective working lines, a protection line interconnecting said sending station with said receiving station, means for abstracting a portion of each of said information signals, means for combining said portions into a frequency multiplexed signal, means for converting said multiplexed signal to a frequency modulated signal for transmission, means for transmitting said multiplexed frequency modulated signal over said protection line, means at said receiving station for demodulating all said frequency modulated signals, means for separating said multiplexed signal into its component portions, means for translating said portions to baseband frequency, utilization circuits individual to each of said working lines and situated at said receiving station, and switching means for applying each of said information signals transmitted over said working lines to a respective one of said utilization circuits when said information signals carried on said working lines are being satisfactorily received at said receiving station and upon disability of any of said working lines for applying the information signal carried on said protection line corresponding to that carried on the disabled working line to the utilization circuit of said disabled line.

5. In a communication system, a transmitter and a receiver, a working line interconnecting said transmitter and said receiver, a source of information signals situated at said transmitter, means for transmitting said information signal over said working line to said receiver, means at said receiver intercepting said information signal, alternate means for transmitting said information signal to said receiver in the event that said information signal transmitted over said working line fails to arrive at said receiver, a utilization circuit situated at said receiver, means for applying said information signal transmitted over said working line to said utilization device, means for applying said information signal carried by said alternate means to said utilization circuit in the event of failure of said working line, and means for introducing delays into the signal paths of both said working lines and said alternate means at said receiver each equal to the conversion time from said working line to said alternate means in order that signal failures of said working line may be anticipated.

6. In a communication system, a sending point and a receiving point, at least two working lines interconnecting said sending point and said receiving point, information signal sources individual to said working lines and situated at said sending point, a protection line interconnecting said sending point and said receiving point, said sending point comprising means for transmitting each of said information signals over its respective working line, means for abstracting a portion of each of said information signals, means for combining said portions, and means for transmitting the combined signal over said protection line, and said receiving point comprising means for receiving said information signals from said working lines, means for recovering said combined signal from said protection line, means for separating said combined signal into its component portions, load circuits individual to each of said working lines, means for applying each of said information signals carried by said working lines to its respective load circuit, means upon failure of the information signal carried by any of said working lines to arrive at said receiving point for applying the portion of the information signal carried on said protection line corresponding to that carried on the failed working line to the load circuit of said failed working line, and means for applying a fixed time delay equal to the time required to change operation from said failed working line to said protection line to each of said information signals received over said working lines and to said combined signal received over said protection line.

References Cited in the file of this patent

UNITED STATES PATENTS

| | | |
|---|---|---|
| 2,390,869 | Carter | Dec. 11, 1945 |
| 2,686,256 | Albersheim | Aug. 10, 1954 |
| 2,733,296 | Maggio | Jan. 31, 1956 |